United States Patent Office 3,482,023
Patented Dec. 2, 1969

3,482,023
PROCESS FOR TREATING COCCIDIOSIS WITH DIHYDROACTINOSPECTACIN
Ronald E. Bloss, Portage, Mich., assignor to The Upjohn Company, Kalamazoo, Mich., a corporation of Delaware
No Drawing. Filed Oct. 15, 1964, Ser. No. 404,178
Int. Cl. A61k 21/00
U.S. Cl. 424—283                              5 Claims

ABSTRACT OF THE DISCLOSURE

Dihydroactinospectacin in combination with animal feed for feeding to meat-producing animals for increased productivity and a process for treating coccidiosis by administering dihydroacinospectacin.

This invention relates to compositions and methods for animal husbandry and more particularly to animal feed compositions containing dihydroactinospectacin and methods for obtaining increased productivity in meat-producing animals and for prophylactic and therapeutic treatment of coccidiosis. It has been found in recent years that meat-producing animals will gain more weight and gain it faster when various classes of compounds such as vitamins, minerals, estrogens, antibiotics, and tranquilizers are added to the diet. Although the presently available compounds are useful, new materials are still being sought that would produce weight gains more rapidly, to a greater extent, more efficiently with respect to feed intake, at a lower cost, and without undesirable side effects.

One embodiment of the present invention encompasses a nutritionally adequate animal feed having dispersed therein dihydroactinospectacin. Another embodiment includes the process of feeding the composition to meat-producing animals to provide an increased rate of weight gain, an increased amount of weight gain, and increased feed efficiency.

The dihydroactinospectacin is added to the animals' nutritionally adequate feedstuff in a total amount of from 2 to 100 mg. per pound of feed.

Coccidiosis is a disease caused by a parasitic protozoan of the class Sporozoa, order Coccidia. The protozoan in the parasitic stage of the life cycle infests the intestinal tract of the host animals. The disease is encountered in the raising of animals for meat; such as cattle, sheep, swine and poultry, animals raised for fur, such as mink, as well as animals kept as pets, such as dogs and cats.

It has now been discovered, in accordance with another embodiment of the present invention, that therapeutic treatment of coccidisois can be accomplished by the administration of dihydroactinospectacin to an animal hosting a coccidial parasite as well as prophylactic treatment for animals subject to infection. For example, cattle infected with *E. zurnii, E. bovis, E. illipsoidalis*; sheep and goats with *E. parva, E. faurei*, swine with *E. debliecki, E. scabra*, and *Isospora suis*; dogs and cats with *Isospora bigemina, Isopora felis, Eimeria canis, Eimeria felina*; poultry with *E. tenella*; rabbits with *E. stiedae, E. perforans*; and mink with *E. mustelae* can be treated.

As used in the specification and claims dihydroactinospectacin is used to mean the compound in the free base form and is taken to include, as equivalents, the acid addition salts thereof as well as the di-N-acyl and tetra-N, O-acyl derivatives and the acid addition salts thereof. Dihydroactinospectacin can be prepared by methods disclosed in J.A.C.S, vol. 8, p. 2655, Sept. 5, 1963, and in copending application Ser. No. 167,931, now U.S. Patent No. 3,165,533.

Unless otherwise specified, all percentages are given on a weight to weight basis. The pound (lb.) and ton weight gains are avoirdupois units.

Advantageously, the dihydroactinospectacin is supplied in the form of a liquid or solid premix wherein the antibiotic concentration is 100 to 2000 times greater than the desired antibiotic concentration in the feed. For example, the antibiotics can be dissolved or suspended in a fluid vehicle such as corn oil, cottonseed oil, molasses, distillers solubles and the like to prepare a fluid premix. Alternatively, a solid premix can be prepared by mixing the antibiotics with an edible solid diluent such as sucrose, lactose, starch, corn meal, flour, calcium carbonate, soybeans meal and the like.

Feeding of the compositions of the present invention for weight gain can commence for birds shortly after hatching and in the case of mammals, during the creep-feeding period of suckling animals when they are starting on solid food and, of course, after weaning. Feeding of the compositions is continued throughout the growing period.

The concentration of dihydroactinospectacin in the feed composition is determined with regard to the species of animal, age, weight, and average amount of feed consumed daily. The following table illustrates the range of dihydroactinospectacin in grams per ton of feed for representative animals.

| Animal | Range (gram/ton) | Preferred amount (gram/ton) |
|---|---|---|
| Swine (birth to 8 weeks) | 15 to 200 | 75 |
| Swine (40–100 lb.) | 10 to 200 | 50 |
| Chickens (0–12 weeks) | 4 to 100 | 10 |
| Turkeys (0–24 weeks) | 4 to 100 | 10 |
| Beef cattle (fattening) | 4 to 100 | 8 |
| Calves (0–12 weeks) | 10 to 200 | 50 |
| Lambs | 5 to 100 | 25 |

A variation of the above process is the administration of dihydroactinospectacin dispersed in the animals' drinking water as an alternative to the administration of dihydroactinospectacin in combination with the animals' feed.

For administration with drinking water, a premix is conveniently prepared comprising dihydroactinospectacin in combination with a solid, non-toxic, water-soluble diluent.

The concentration of the dihydroactinospectacin in water is about ½ the concentration (weight to weight basis) of the dihydroactinospectacin concentration in feed, or more conveniently expressed in grams/gallon. For example, in each 250 gallons of drinking water (about 1 ton) would be dissolved the following total amount of dihydroactinospectacin: 7.5 to 100 grams for swine (to 8 weeks); 5 to 100 grams for swine (40–100 lb.) and calves; 2 to 50 grams for chickens, turkeys and cattle; and 2.5 to 50 grams for lambs.

For the treatment of coccidiosis, dihydroactinospectacin can be administered to the host animal by the oral and parenteral routes. Dihydroactinospectacin can be administered in the pure form, however, it is more convenient if it is administered in combination with a carrier, a feed or the drinking water. Preferably the administration of dihydroactinospectacin is accomplished in association with a solid or fluid carrier, advantageously in unit dosage form or in association with the feed.

The amount of dihydroactinospectacin for administration is determined with regard to the species of the host animal and the animal's weight. The following table illustrates the dosage range of the dihydroactinospectacin to be administered for representative animals in mg. of dihydroactinospectacin/kg. of body weight:

| Animals | Dose (mg./kg.) | Preferred (mg./kg.) |
|---|---|---|
| Cattle | 1–10 | 3 |
| Sheep | 1–10 | 3 |
| Goats | 1–10 | 3 |
| Swine | 10–200 | 50 |
| Dogs | 10–200 | 50 |
| Cats | 10–200 | 50 |
| Rabbits | 10–150 | 50 |
| Mink | 10–150 | 50 |
| Chickens | 5–50 | 20 |
| Turkeys | 5–50 | 20 |
| Geese | 5–50 | 20 |
| Ducks | 5–50 | 20 |

The following examples illustrate the best mode contemplated by the inventor for carrying out the invention but are not to be construed as limiting the scope thereof.

EXAMPLE 1

Premix A

| | | |
|---|---|---|
| Dihydroactinospectacin | gm | 2.5 |
| Lactose, q.s. | lb | 1.0 |

Premix B

| | | |
|---|---|---|
| Dihydroactinospectacin | gm | .4 |
| Calcium carbonate, q.s. | lb | 1.0 |

Premix C

| | | |
|---|---|---|
| Dihydroactinospectacin | gm | .5 |
| Corn meal, q.s. | lb | 1.0 |

Premix D

| | | |
|---|---|---|
| Dihydroactinospectacin | gm | 1.2 |
| Cottonseed oil, q.s. | lb | 1.0 |

Premix E

| | | |
|---|---|---|
| Dihydroactinospectacin | gm | 1.1 |
| Sucrose, q.s. | lb | 1.0 |

Premix F

| | | |
|---|---|---|
| Dihydroactinospectacin | gm | 6.0 |
| Oyster shell flour, q.s. | lb | 1.0 |

Premix G

| | | |
|---|---|---|
| Dihydroactinospectacin | gm | 0.2 |
| Wheat flour, q.s. | lb | 1.0 |

Premix H

| | | |
|---|---|---|
| Dihydroactinospectacin | gm | 2.0 |
| Corn oil, q.s. | lb | 1.0 |

The foregoing premix formulas are prepared using finely ground solid materials and mixing all ingredients together in an appropriate manner.

EXAMPLE 2

A swine growing diet for hogs of 40 to 100 pounds body weight is prepared from the following types and amounts of ingredients:

| | Percent |
|---|---|
| Corn, ground | 78.15 |
| Soybean oil meal, 44% | 17.0 |
| Meat and bone scraps, 50% | 3.0 |
| Oyster shell flour | 0.4 |
| Bonemeal | 0.5 |
| Sodium chloride | 0.5 |
| Trace mineral mixture [1] | 0.05 |
| Zinc oxide | 0.01 |
| Vitamin A and D supplement [2] | 0.22 |
| B vitamin supplement [3] | 0.04 |
| Vitamin $B_{12}$ supplement [4] | 0.08 |

[1] Contains the following % of minerals: Mn, 12; Co, 0.8; Fe, 5.0; Cu, 0.4; I, 0.24; Zn, 0.7.
[2] Contains 300 U.S.P. units $D_3$/gm. and 1500 I.U.A./gm.
[3] Contains per lb.: riboflavin, 2000 mg.; calcium pantothenate, 4000 mg.; niacin, 9000 mg.; and choline chloride, 10,000 mg.
[4] Contains 6 mg. vitamin $B_{12}$ per lb.

To 99 parts of the preceding feed is added 1 part of Premix A to provide a feed with 25 mg. of dihydroactinospectacin per lb. of feed.

Substituting Premixes B through H, inclusive, feeds are prepared with varying amounts of dihydroactinospectacin.

The foregoing composition is usefully fed to hogs for increased rate of weight gain and for improved feed efficiency.

EXAMPLE 3

A fattening feed for 800 pound yearling cattle is prepared from the following types and amounts of ingredients:

| | Percent |
|---|---|
| Ground ear corn | 89.75 |
| Soybean oil meal, 44% | 9.0 |
| Ground limestone | 0.7 |
| Sodium chloride | 0.5 |
| Trace mineral mixture [1] | 0.05 |

[1] Contains the following percent of minerals: (Mn, 12; Co, 0.08; Fe, 5.0; Cu, 0.4; I, 0.24; Zn, 0.7.

To 99 parts of the preceding feed is added 1 part of Premix B to provide a feed with 4 mg. of dihydroactinospectacin per lb. of feed.

Substituting Premixes A through H, inclusive, feeds are prepared with varying amounts of dihydroactinospectacin.

Cattle are to receive the foregoing feed ad libitum together with 5 lb. of hay per head per day for an increased rate of weight gain and increased feed efficiency.

EXAMPLE 4

A chicken feed for broilers is prepared from the following types and amounts of ingredients:

| | Percent |
|---|---|
| Yellow corn meal | 67.35 |
| Soybean oil meal, 50% | 24.00 |
| Menhaden fish meal, 60% | 6.00 |
| Steamed bone meal | 1.00 |
| Ground limestone | 1.00 |
| Iodized salt | .34 |
| 25% choline chloride | .13 |
| Vitamin $B_{12}$ supplement (6 mg./lb.) | .10 |
| Manganese sulfate | .02 |
| Supplement vitamin mix [1] | .06 |

[1] Consisting of 16.0 gm. vitamin A supplement (10,000 units/gm.); 3.6 gm. vitamin $D_3$ supplement (15,000 units/gm.); 7.1 gm. riboflavin supplement (1 gm. riboflavin per ounce); 500 mg. niacin.

To 99 parts of the preceding feed is added 1 part of Premix C to provide a feed with 5 mg. of dihydroactinospectacin per lb. of feed.

Substituting Premixes A through H, inclusive, feeds are prepared with varying amounts of dihydroactinospectacin.

The foregoing composition is usefully fed to chickens for increased rate of weight gain and improved utilization of feed.

EXAMPLE 5

A diet for fattening lambs is prepared from the following types and amounts of ingredients:

| | Percent |
|---|---|
| Ground ear corn | 82.05 |
| Alfalfa meal | 10.0 |
| Soybean oil meal 44% | 7.0 |
| Ground limestone | 0.3 |
| Salt | 0.6 |
| Trace mineral mixture [1] | 0.05 |

[1] Contains the following percent of minerals: Mn, 12; Co, 0.08; Fe, 5.0; Cu, 0.4; I, 0.24; Zn, 0.7.

The above feed to be mixed, pelleted and offered to fattening lambs free-choice in conjunction with hay.

To 99 parts of the preceding feed is added 1 part of Premix D to provide a feed with 12 mg. of dihydroactinospectacin per lb. of feed.

Substituting Premixes A through H, inclusive, feeds are prepared with varying amounts of dihydroactinospectacin.

EXAMPLE 6

A premix for addition to drinking water is prepared from the following types and amounts of ingredients:

| | Gm. |
|---|---|
| Dihydroactinospectacin | 10 |
| Sucrose | 444 |

The dihydroactinospectacin and sucrose are mixed together.

The premix is added to drinking water in the following amounts: chickens and turkeys ½ lb./250 gallons; beef cattle 1 lb./250 gallons; and swine (40 to 100 lbs.) 2 lb./250 gallons.

EXAMPLE 7

1000 tablets for treating coccidiosis in small animals is prepared from the following types and amounts of ingredients:

| | Gm. |
|---|---|
| Dihydroactinospectacin | 50 |
| Lactose | 125 |
| Corn starch | 65 |
| Magnesium stearate | 25 |

The ingredients are thoroughly mixed and slugged. The slugs are broken down by forcing through a number 16 screen. The resulting granules are then compressed into tablets, each tablet containing 50 mg. of dihydroactinospectacin.

The tablets so prepared are useful in treating coccidial infection in dogs, cats, and rabbits when administered orally at a dose of 1 tablet/kg. of animal weight per day.

EXAMPLE 8

A sterile aqueous composition for intramuscular use, containing in 1 cc. 200 mg. of dihydroactinospectacin is prepared from the following types and amounts of ingredients:

| | | |
|---|---|---|
| Dihydroactinospectacin | gm | 200 |
| Lidocaine hydrochloride | gm | 4 |
| Methylparaben | gm | 2.5 |
| Propylparaben | gm | 0.17 |
| Water for injection, q.s. | cc | 1000 |

The ingredients are dispersed in the water and the solution sterilized. The sterile composition is filled into vials and the vials sealed.

The solution is useful in the therapeutic treatment of coccidial infections of the following animals at the following daily dosage schedule:

| | | |
|---|---|---|
| Cattle | cc./100 lb | 1.0 |
| Sheep and goats | cc./10 lb | 0.25 |
| Mink | cc./1 lb | 0.1 |

EXAMPLE 9

A feed for treating coccidiciosis in cattle is prepared from the following types and amounts of ingredients:

| | Percent |
|---|---|
| Ground ear corn | 89.75 |
| Soybean oil meal, 44% | 9.0 |
| Ground limestone | 0.7 |
| Salt | 0.5 |
| Trace mineral mixture [1] | 0.05 |

[1] Contains the following percent of minerals: Mn, 12; Co, 0.08; Fe, 5.0; Cu, 0.4; I, 0.24; Zn, 0.7.

To 999 parts of the preceding feed is added 1 part of a premix composition prepared by mixing 200 gm. of dihydroactinospectacin with sufficient wheat flour to make 1 pound.

The feeding composition so prepared supplies 200 mg. of dihydroactinospectacin per pound, or about 440 parts per million.

Cattle infected with coccida are fed 1 lb./day of the above feed for each 100 lb. of body weight.

Similarly the feed can be fed to cattle as a prophylatic measure for the prevention of coccidial infection.

EXAMPLE 10

A feed for treating chickens infested with *E. tenella* is prepared from the following types and amounts of ingredients:

| | Percent |
|---|---|
| Yellow corn meal | 67.35 |
| Soybean oil meal | 24.00 |
| Menhaden fish meal | 6.00 |
| Steamed bone meal | 1.00 |
| Ground limestone | 1.00 |
| Iodized salt | .34 |
| 25% choline chloride | .13 |
| Vitamin $B_{12}$ supplement (6 mg./lb.) | .10 |
| Manganese sulfate | .02 |
| Supplement vitamin mix [1] | .06 |

[1] Consisting of 16.0 gm. vitamin A supplement (10 units/mg.); 3.6 gm. vitamin $D_3$ supplement (15,000 units/gm.); 7.1 gm. riboflavin supplement (1 gm. riboflavin per ounce); 500 mg. niacin.

To 999 parts of the preceding feed is added 1 part of a premix composition prepared by mixing 56.7 gm. dihydroactinospectacin with sufficient soybean mill feed to make 1 pound.

The feeding composition so prepared supplies 56.7 mg. of dihydroactinospectacin per pound, or about 102 parts per million.

The foregoing composition is usefully fed ad libitum to chickens infected with *E. tenella*. Similarly the composition can be fed to turkeys, ducks and geese, hosting coccidia.

Similarly, the composition can be fed to poultry for the prevention of coccidial infection.

EXAMPLE 11

A feed for treating coccidiosis in swine is prepared from the following types and amounts of ingredients:

| | Percent |
|---|---|
| Corn, ground | 78.15 |
| Soybean oil meal, 44% | 17.0 |
| Meat and bone scraps, 50% | 3.0 |
| Oyster shell flour | 0.4 |
| Bone meal | 0.5 |
| Salt | 0.5 |
| Trace mineral mixture [1] | 0.05 |
| Zinc oxide | 0.01 |
| Vitamin A and D supplement [2] | 0.22 |
| B Vitamin supplement [3] | 0.04 |
| Vitamin $B_{12}$ supplement [4] | 0.08 |

[1] Contains the following percent of minerals: Mn, 12; Co, 0.08; Fe, 5.0; Cu, 0.4; I, 0.24; Zn, 0.07.
[2] Contains 300 USP units $D_3$/gm. and 1500 I.U.A./gm.
[3] Contains per lb.: riboflavin, 2000 mg.; calcium pantothenate, 4000 mg.; Niacin, 9000 mg.; and choline chloride, 10,000 mg.
[4] Contains 6 mg. vitamin $B_{12}$ per lb.

To 999 parts of the preceding feed is added 1 part of a premix composition prepared by mixing 300 gm. of dihydroactinospectacin with sufficient ground limestone to make one pound.

The feeding composition so prepared supplies 300 mg. of dihydroactinospectacin per pound, or about 660 parts per million.

The foregoing composition is usefully fed to hogs infected with coccidia at 2-lb./day for each 50 lb. of body weight.

Similarly, the composition can be fed to hogs for the prevention of coccidial infections.

EXAMPLE 12

Following the procedure of the preceding Examples 1 through 11, inclusive, compositions are similarly prepared substituting an equivalent amount each of dihydroactinospectacin, dihydrochloride, and dihydroactinospectacin sulfate for the dihydroactinospectacin of the example.

Dihydroactinospectacin is also known as dihydrospectinomycin.

What is claimed is:

1. A process for treating coccidiosis in the gastro-intestinal tract of an infected animal comprising the administration to an animal hosting a coccidial infection a therapeutically effective anticoccidial amount of dihydroactinospectacin.

2. A process for treating coccidiosis in the gastro-intestinal tract of an infected animal comprising the oral administration to an animal hosting a coccidial infection a therapeutically effective anticoccidial amount of dihydroactinospectacin.

3. A process for treating coccidiosis in the gastro-intestinal tract of an infected animal comprising the administration to an animal hosting a coccidial infection from about 1 mg./kg. to about 200 mg./kg. of dihydroactinospectacin.

4. A process for treating coccidiosis in the gastro-intestinal tract of an infected animal comprising the oral administration to an animal hosting a coccidial infection from about 1 mg./kg. to about 200 mg./kg. of dihydroactinospectacin.

5. A process for treating coccidiosis in poultry comprising the oral administration to poultry hosting a coccidial infection of from about 5 mg./kg. to about 50 mg./kg. of dihydroactinospectacin, said dihydroactinospectacin administered in combination with a poultry feed.

References Cited

UNITED STATES PATENTS

| | | | |
|---|---|---|---|
| 3,165,533 | 1/1965 | Hoeksema et al. | 260—340.3 |
| 3,234,092 | 2/1966 | Bergy et al. | 167—65 |
| 3,245,797 | 4/1966 | Bergy et al. | 99—2 |

FRANK CACCIAPAGLIA, Jr., Primary Examiner